United States Patent [19]

Mori

[11] Patent Number: 4,875,221
[45] Date of Patent: Oct. 17, 1989

[54] SPREAD SPECTRUM RECEIVER

[75] Inventor: Masaharu Mori, Tokyo, Japan

[73] Assignee: Clarion Co., Ltd., Tokyo, Japan

[21] Appl. No.: 107,373

[22] Filed: Oct. 9, 1987

[30] Foreign Application Priority Data

Oct. 14, 1986 [JP] Japan ................................. 61-243595

[51] Int. Cl.⁴ ............................................. H04K 1/00
[52] U.S. Cl. ....................................................... 375/1
[58] Field of Search ............................... 375/1; 380/34

[56] References Cited

U.S. PATENT DOCUMENTS

| | | | |
|---|---|---|---|
| 4,300,235 | 11/1981 | Outram | 375/1 |
| 4,324,002 | 4/1982 | Spilker, Jr. | 380/34 |
| 4,327,438 | 4/1982 | Baier et al. | 375/1 |
| 4,435,821 | 3/1984 | Ito et al. | 375/1 |
| 4,670,885 | 6/1987 | Parl et al. | 375/1 |
| 4,691,326 | 9/1987 | Tsuchiya | 375/1 |
| 4,730,340 | 3/1988 | Frazier, Jr. | 375/1 |

Primary Examiner—Salvatore Cangialosi
Attorney, Agent, or Firm—Flynn, Thiel, Boutell & Tanis

[57] ABSTRACT

A spread spectrum receiver including a convolver for establishing initial synchronization of received and reference pseudo noise codes and a delay lock circuit or other circuit for subsequently tracking the phase difference between both pseudo noise codes includes a delay adjuster which is provided between a reference pseudo noise code generator and a code phase adjuster for supplying the reference pseudo noise code generator with a control signal to delay the control signal in order to eliminate a variety of the delay time of the convolver and influences of the temperature characteristic.

14 Claims, 9 Drawing Sheets

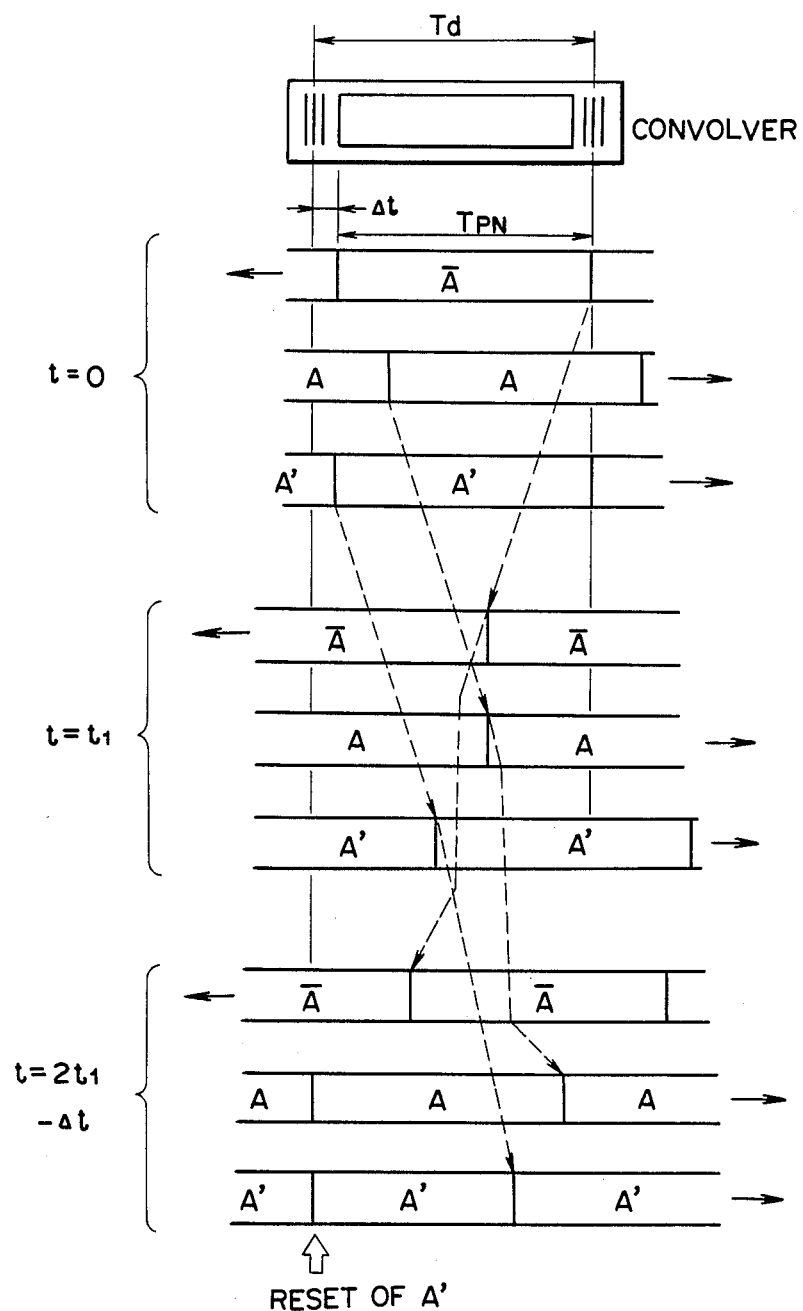

SPREAD SPECTRUM RECEIVER

FIELD OF THE INVENTION

This invention relates to a spread spectrum receiver, and more particularly to a spread spectrum receiver suitable for a system configured to first establish an initial synchronization in a convolver and thereafter effect a tracking using a delay lock, etc.

BACKGROUND OF THE INVENTION

FIG. 5 shows a direct sequence system which is one of spread spectrum communication systems.

In FIG. 5, a transmitter of the aforegoing system generally comprises a carrier wave generator 1, a mixer 2, a transmission pseudo noise code generator 3 and an antenna 6a. A receiver generally comprises a mixer 4, a reference pseudo noise code generator 5 and an antenna 6b.

A carrier wave outputted from the generator 1 (and modulated by information) and a pseudo noise code outputted from the pseudo noise code generator 3 are multiplied by the mixer 4, and a spread signal of a spectrum obtained from the mixer 4 is emitted from the antenna 6a. The receiver originally prepares in the reference pseudo noise code generator 5 a reference pseudo noise code which is identical to a pseudo noise code included in a received signal and has a phase identical to same, and multiplies it with a signal received by the antenna 6b in the mixer 4 to demodulate the carrier wave first modulated by information.

In a communication system as shown in FIG. 5, immediate and proper phase synchronization of the reference pseudo noise code of the receiver is one of the most important technologies. The phase synchronization process is divided into two steps, i.e. an initial synchronization process for finding a synchronous phase and a process for tracking the detected phase. Known technologies for the initial synchronization are sliding correlators, matched filters and others. Known tracking technologies are a tau-dither tracking and a delay lock tracking. Such a sliding correlator is configured to continuously change the phase of a reference pseudo noise code by slightly shifting the frequency of a reference pseudo noise code generating clock with respect to a transmission pseudo noise code generating clock in order to find a synchronous phase. Instead of shifting the frequency, the code phase may be varied stepwisely. However, both cases require a long time until the synchronous phase is detected. The use of a matched filter is effective to decrease the time.

Such a matched filter is a transversal filter weighted by a predetermined code pattern. One period or part of one period of a transmission pseudo noise code pattern is used as the code pattern, synchronization detection is greatly speeded up.

FIG. 6 shows an example of a delay line matched filter in which adders 8 and 9 are connected to taps of a delay line 7, and a phase inverter 10 is connected to the adder 9, so that an adder 11 adds outputs of the inverter 10 and adder 8.

When synchronization detection is performed by the matched filter, it is followed by a tracking process of the detected phase. The tracking is performed, using a delay lock circuit as shown in FIG. 7.

In FIG. 7, an IF amplifier 13 and a demodulator 14 are connected in sequence to a mixer 12 in which an input signal is entered. Mixers 15 and 16 are connected in parallel with the mixer 12, and their output stages are connected to envelope detectors 17 and 18. Outputs of the envelope detectors 17 and 18 are connected to a differential amplifier 19. The differential amplifier 19 are connected in series to a low pass filter 20, clock generator 21 and a pseudo noise code generator 22. An output of the pseudo noise code generator 22 is applied to the mixers 15 and 16. A ½ clock delay circuit 23 is provided for the pseudo noise code generator 22 to apply its output clock to the mixer 12.

Operation of the circuit of FIG. 7 is explained below, referring to a time chart of FIG. 8.

A pseudo noise code and an input signal are multiplied by the mixers 15 and 16 under different pseudo noise codes. Their detection outputs A and B have a time difference T as shown in FIG. 8. The detection outputs A and B are entered in the amplifier 19, and an output waveform C of the amplifier 19 exhibits a form summing both inputs, with its intermediate point being a tracking point Q.

Details of the aforegoing circuit is described in "Spread Spectrum Systems" by R. C. Dixon.

A matched filter is effective in order to obtain a high speed initial synchronization. However, since the detectable pseudo noise code is fixed, a number of matched filters are required in case of a code division multiple access. In this connection, an attention is paid in recent years to a convolver which can be used as a programmable matched filter. One of such convolvers is a monolithic ZnO/Si Sezawa wave convolver reported under the title of "Efficient Monolithic ZnO/Si Sezawa Wave Convolver" in Ultrasonics Symposium of IEEE 1982.

FIG. 9 is a block diagram showing an example of a correlator.

A carrier wave generator produces a carrier wave having a frequency fo. A reference pseudo noise code generator 25 produces a reference pseudo noise code. Their outputs are applied to a mixer 27. An output of the mixer 27 is applied to a convolver 28 together with the received signal fo, and a signal 2fo is outupputted. The reference pseudo noise code is time-inverted with respect to a pseudo noise code of the transmitter side, and the center frequency of its output is twice the input. The time width of its correlation output is set at a half clock period with respect to the clock period in the system using a matched filter.

The use of the convolver 28 in lieu of a matched filter for synchronization detection of the initial synchronization provides a spread spectrum receiver using a desired pseudo noise code.

As to synchronization detection, D. Brod & Korb proposed "Fast Synchronization in a Spread-Spectrum System based on Acoustoelectric Convolvers" in Ultrasonics Symposium of 1978 IEEE. The system includes a counter in a receiver to determine how much the phase of the reference pseudo noise code should be shifted in the initial synchronization. This is explained below, referring to FIG. 11.

Td designates the delay time of a convolver 30, A denotes a received pseudo noise code, and $\overline{A}$ is a reference pseudo noise code obtained by time-inverting the pseudo noise code A. Code $\overline{A}$ and code A advance in opposite directions in the convolver 30. When the head of code $\overline{A}$ is entered in the convolver 30, the counter starts its operation. When the counter counts t1 seconds, both codes coincide, and a large correlation output is obtained. By detecting this, it is recognized that both codes coincide at t1 seconds after the counting is commenced. It takes another t1 seconds for the head of the code A to reach the convolver input. Therefore, by measuring time t1 in the counter, the phase difference between both codes is known. It should be noted that one period length $T_{PN}$ of the pseudo noise code is shown in FIG. 11 as being equal to the delay time Td.

By employing the aforegoing method for establishing initial synchronization, high-speed initial synchronization is expected.

A means including a delay lock for tracking the detected phase difference is explained below, referring to FIG. 12.

One input end of a convolver 31 is connected in series to a mixer 32, a pseudo noise code generator 33 and a clock generator 34. The other input end of the convolver 31 is supplied with a received signal. A carrier wave generator 35 is connected to the mixer 32 to superpose a carrier on a pseudo noise code. On the other hand, the output end of the convolver 31 is connected in series to an envelope detector 36, a threshold detector 37 and a code phase adjuster 38. The code phase adjuster 38 is connected to a pseudo noise code generator 39 which is supplied with an output from the clock generator 35 and a start signal input. Further, a delay lock circuit 40 is provided for producing an LPF output and information output to the clock generator 34, based on the received signal input and an output of the pseudo noise code generator 39, respectively.

In FIG. 12, an output 2fo of the convolver 31 is entered in the code phase adjuster 38 after demodulation and threshold detection. The code phase adjuster 38 is configured to measure time t1 shown in FIG. 11 and adjust the code phase of the pseudo noise generator 39. The pseudo noise generator 39 controls the delay lock circuit 40 and tracks the above-mentioned phase difference.

In the described receiving system, high accuracy is required in the delay time Td of the convolver. For example, as shown in FIG. 13, there is a case where Td is larger by $\Delta t$ than $T_{PN}$. In FIG. 13, the pseudo noise code of the pseudo noise code generator 39 of FIG. 12 is shown by A'. When t=t1, a correlation output is obtained. It is at the time of $t=2t1-\Delta t$ and not $t=2t1$ shown in FIG. 11 that the head of the received pseudo noise code A is entered in the convolver 31 subsequently. If $\Delta t$ is already known, the pseudo noise generator 39 may be adjusted by the code phase adjuster 38 so that code A' starts from its head when $t=2t1-\Delta t$.

In the prior art spread spectrum receiver, however, if the $\Delta t$ is not known, a phase error corresponding to $\Delta t$ is produced between the pseudo noise codes A and A'. For example, when Td=9 µsec and clock cycle T=0.1 µsec, Td error amounts 9±0.05 µsec because the error in the initial synchronization must be ±T/2 as will be understood from FIG. 8. Therefore, there is a possibility of exceeding the variety of the convolver as manufactured. The variety can be eliminated by selecting products having acceptable Td. However, this apparently increases the manufacturing cost.

Additionally, there is possibility that Td exceeds an acceptable range due to the temperature characteristic of the convolver, and this prevents a reliable reception.

OBJECT OF THE INVENTION

It is therefore an object of the invention to provide a spread spectrum receiver eliminating variety in the delay time of convolvers as manufactured and influences of the temperature characteristics.

SUMMARY OF THE INVENTION

The object of the invention is attained by the use of a delay adjuster interposed between a reference pseudo noise code generator and a code phase adjuster to delay an output of the code phase adjuster.

With this arrangement, by applying an external clock to the pseudo noise code generator in the initial adjustment, the phase of the pseudo noise code after the initial synchronization is maintained, without tracking the above-mentioned phase difference. Therefore, the amplitude level of an information output can be readily acknowledged. Further, the delay adjuster delays an output pulse of the code phase adjuster to thereby offset the original variety in the delay time of the convolver as manufactured and effect a temperature compensation.

BRIEF DESCRIPTION OF THE DRAWINGS

FIG. 13 is a view showing a further phase shifting.

DETAILED DESCRIPTION

Figure 1:
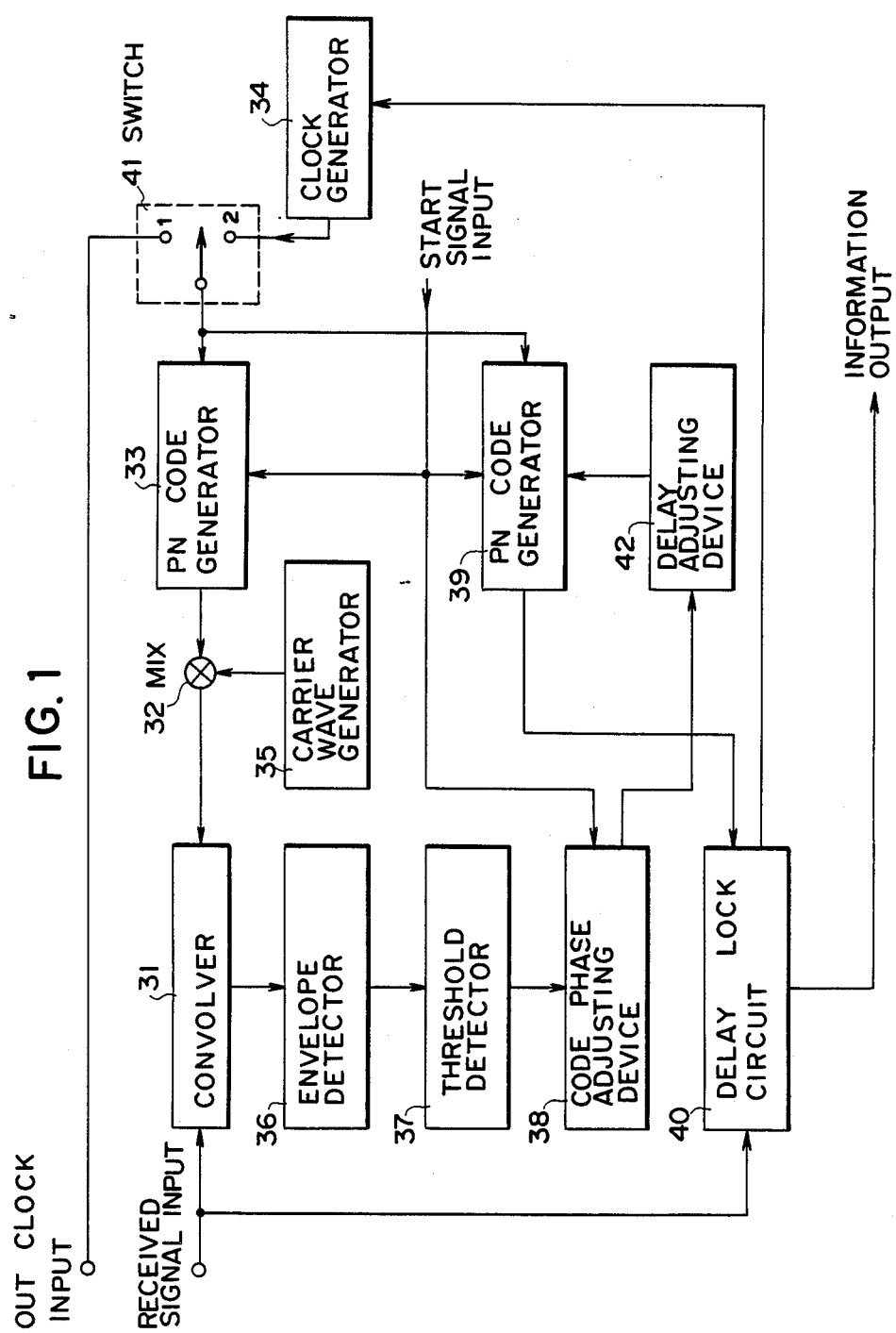
FIG. 1 is a block diagram showing an embodiment of the invention.
Figure 12:
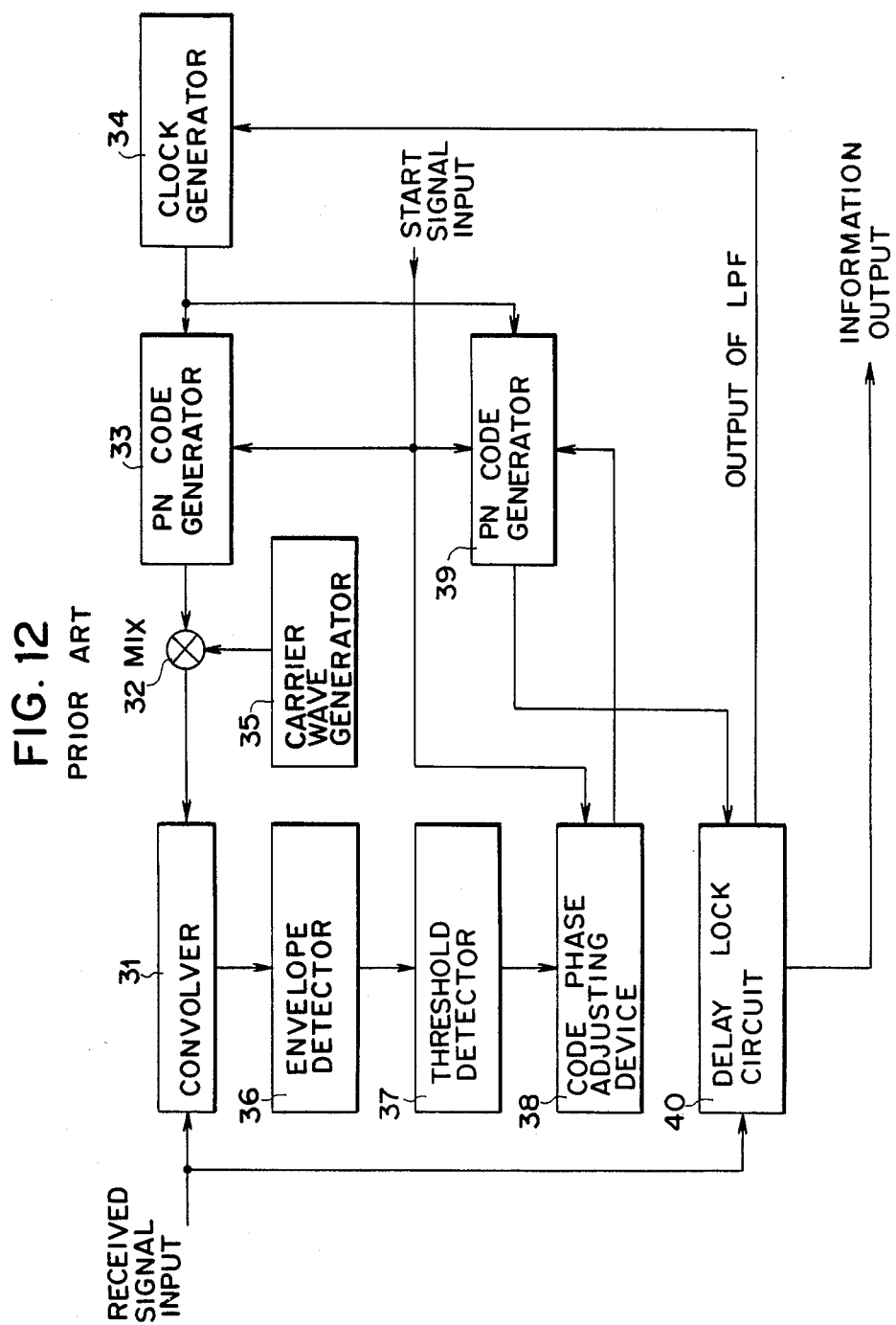
FIG. 12 is a block diagram of a receiver using a delay lock circuit.

The invention is described below, referring to a preferred embodiment illustrated in the drawings. FIG. 1 is a block diagram showing an embodiment of the invention. In FIG. 1, circuit parts or members identical to those of FIG. 12 are denoted by the same reference numerals, and explanation is omitted as far as it is redundant.

Figure 2:
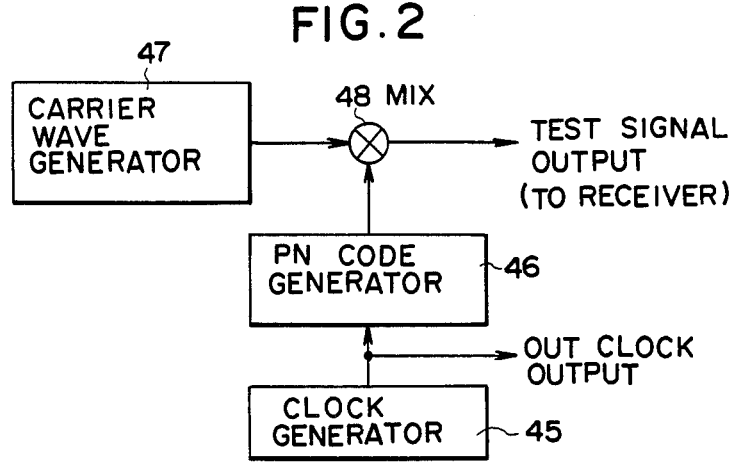
FIG. 2 is a block diagram showing a test signal generator related to the invention.

The illustrated embodiment includes a switch 41 provided at the output of the clock generator 34 to switchingly enter in the pseudo noise code generators 33 and 39 one of the output of the clock generator 34 and an external clock. A test signal generator is used as a source of the external clock. The test signal generator is connected to the switch upon an initial adjustment. FIG. 2 shows an example of the test signal generator.

In FIG. 2, reference numeral 45 denotes a clock generator for generating clock signals having a predetermined cycle to serve as the external clock shown in FIG. 1. A pseudo noise code generator 46 produces a pseudo noise code based on the clock. A carrier wave generator 47 produces a carrier wave. A mixer 48 mixes outputs of both generators 46 and 47 and produces a mixer output which serves as a test signal output (receiver input, i.e. convolver input).

Figure 3:
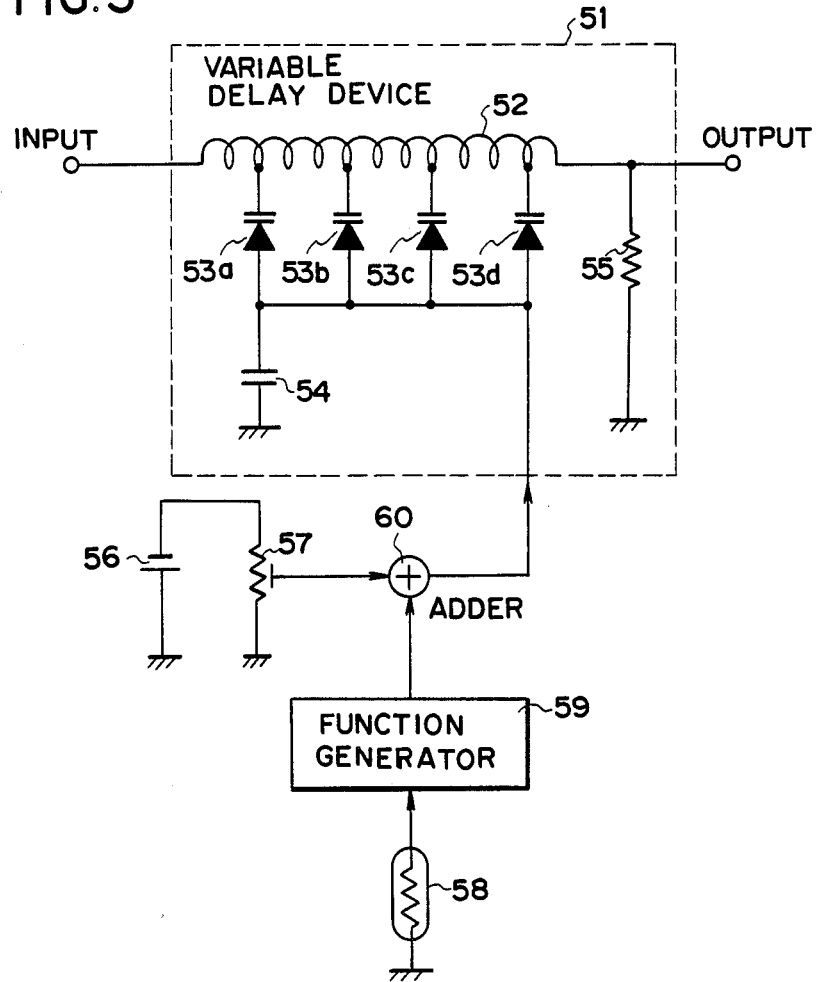
FIGS. 3 and 4 are block diagrams showing two delay adjusters related to the invention.

FIG. 3 is a circuit diagram showing details of the delay adjuster 42.

Reference numeral 51 denotes a variable delay circuit which includes a coil 52 connected between an input terminal and an output terminal, variable capacitance diodes 53a through 53d each connected to one of taps of the coil 52, a capacitor 54 connected between commonly connected anodes of the diodes and a grounded point, and a resistor 55 connected between the output terminal and a grounded point. The group of variable capacitance diodes cooperates with the coil 52 to constitute an LC delay circuit so that the delay amount is adjusted by an electrostatic capacitance which varies with voltage applied to the diodes.

In order to obtain the voltage to be applied to the diodes 53, there are provided a heat sensitive element 58 for generating voltage responsive to a present temperature and a function generator 59 for generating a function value responsive to a detection value for the element 58, in addition to a d.c. source 56 for generating a reference voltage and a variable resistor 57. Further, an adder 60 is provided for adding an output voltage of the variable resistor 57 and an output voltage of the function generator 59 to apply a resulting output to the diodes 53.

Figure 4:
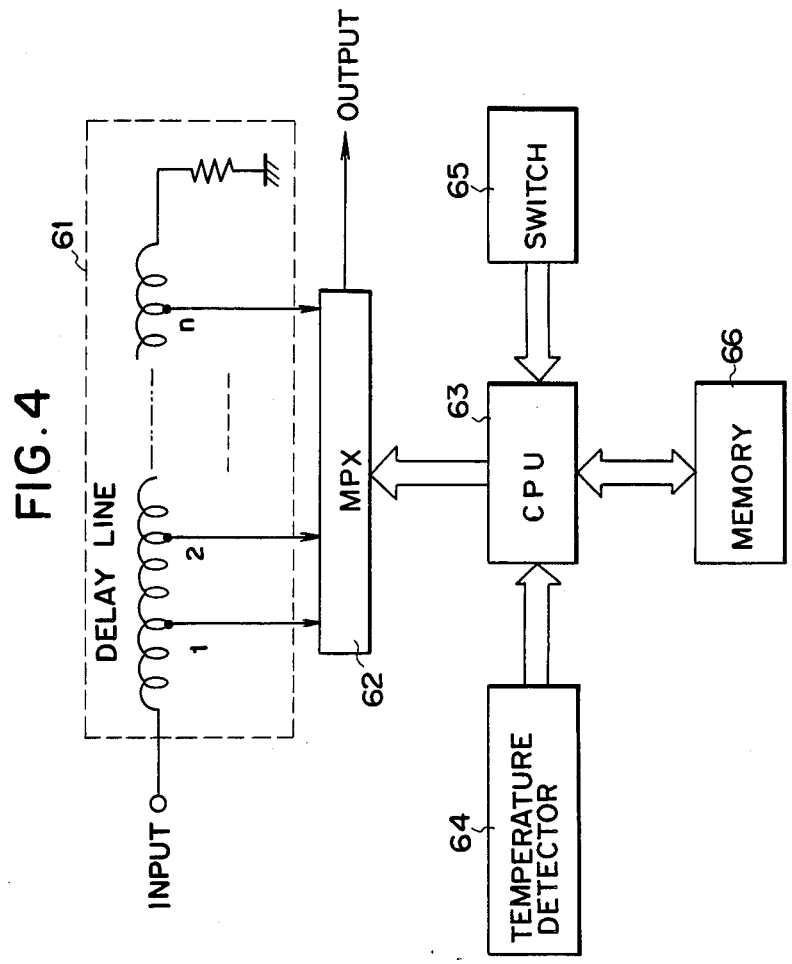
Figure 5:
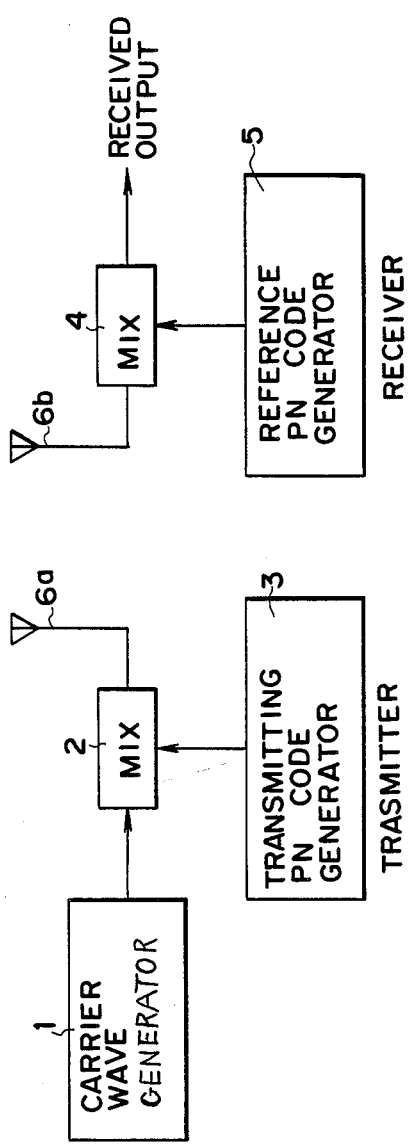
FIG. 5 is a block diagram schematically showing a spread spectrum communication system.
Figure 6:
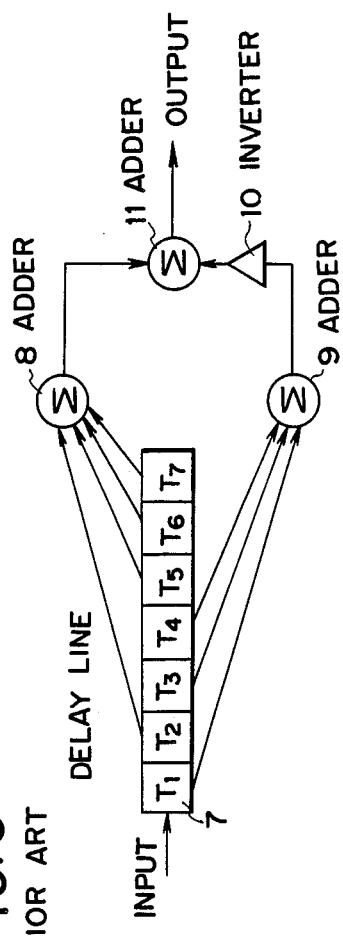
FIG. 6 is a circuit diagram showing a delay line matched filter.
Figure 7:
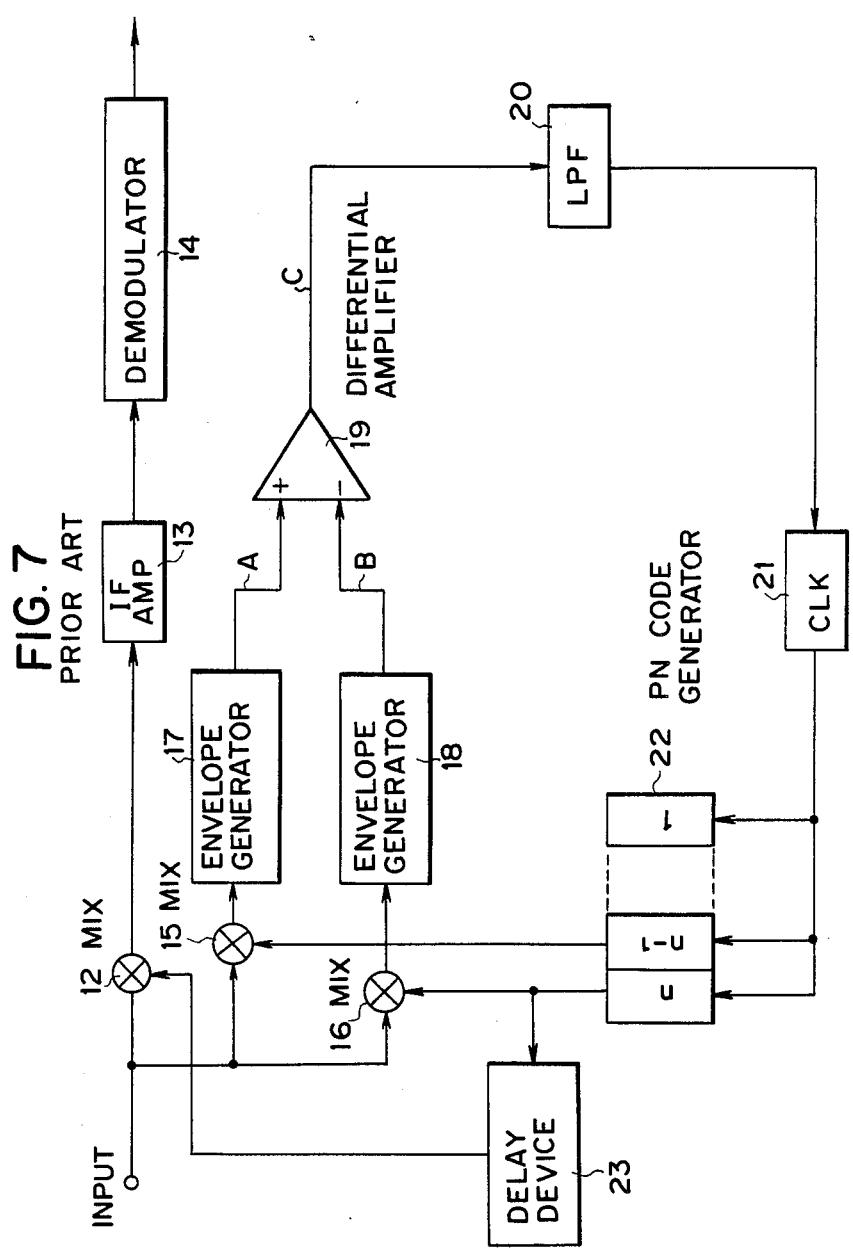
FIG. 7 is a block diagram showing a delay lock circuit of a prior art spread spectrum receiver.
Figure 8:
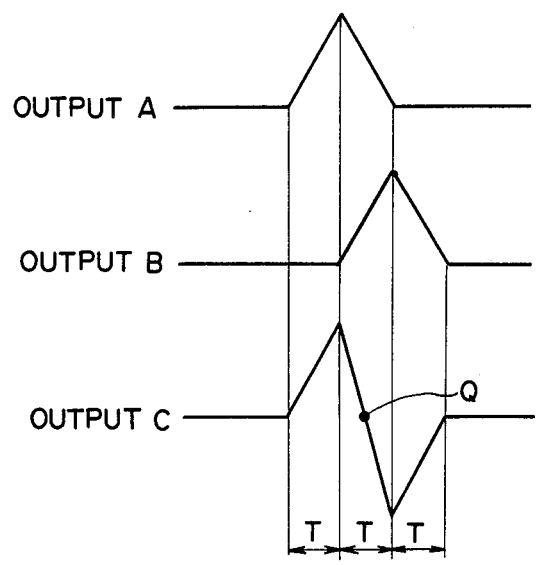
FIG. 8 is a time chart showing operation of the arrangement of FIG. 7.
Figure 9:
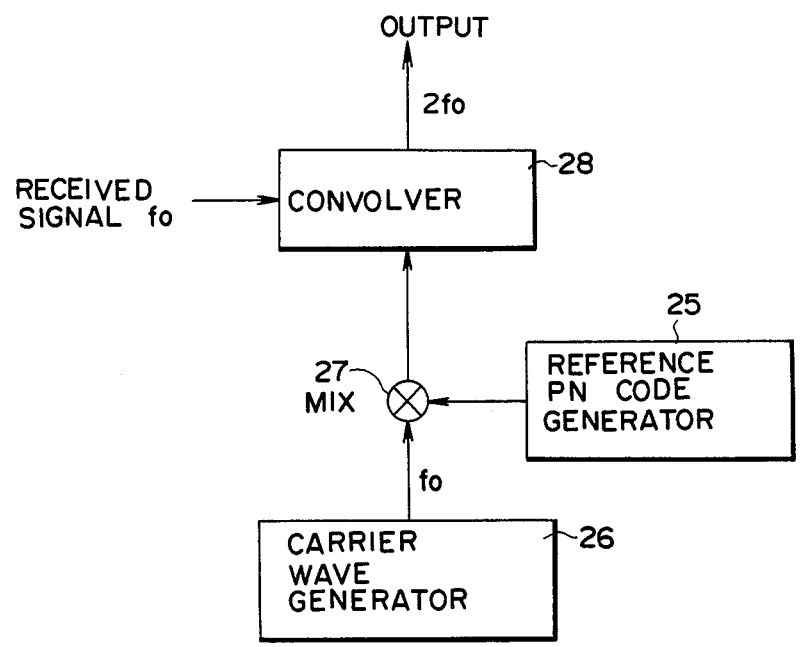
FIG. 9 is a block diagram showing an arrangement of a correlator using a convolver.
Figure 10:
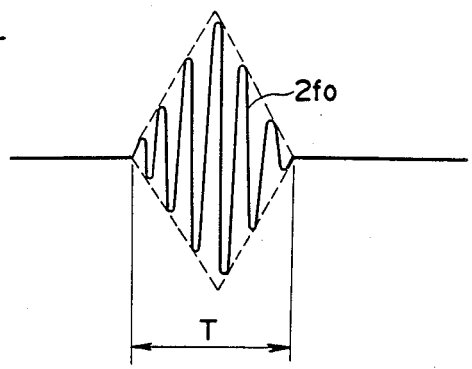
FIG. 10 shows a waveform of an output of the convolver of FIG. 9.
Figure 11:
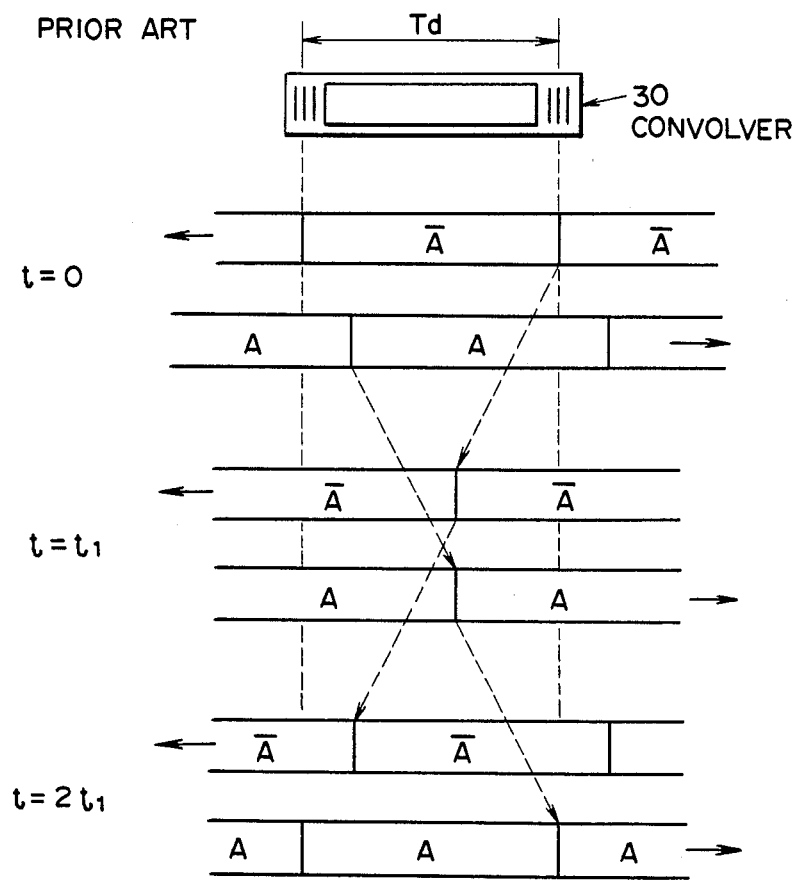
FIG. 11 is a view for explanation of phase shifting of a reference pseudo noise code.

FIG. 4 is a block diagram showing a further arrangement of the delay adjuster 42. A delay line 61 having multiple taps 1 through n each connected to one of input terminals of a multiplexer 62. A CPU 63 controls selection of the taps. The CPU 63 is connected to a temperature detector 64, a switch 65 and a memory 66 to supply information for determining selection of the multiplexer and to store necessary information and program. The delay amount is determined by whichever tap of the delay line 61 is selected by the multiplexer 62.

With this arrangement, the pseudo noise code generator 39 (not-time-inverted reference pseudo noise code generator) shown in FIG. 1 is controlled to start code generation from the head of the code when a start signal is entered at t=0 and to start its code generation again from the head of the code in response to a subsequent output pulse from the code phase adjuster 38. If the delay amount of the delay line 51 of FIG. 3 or the delay line 61 of FIG. 4 is in the range of T1±t1, the output pulse of the code phase adjuster 38 is produced at a timing shown by:

$$t = 2T1 - (T1 + \Delta t1)$$

Further, $t = 2T1 - (T1 + \Delta t1)$ is set at the center value of the delay amount of the convolver, and t1 is set at a larger value than the variety width of $\Delta t$ caused by the variety of the convolver and the temperature.

Under these conditions, the arrangement of FIG. 1 operates as described below.

In order to eliminate influences of the variety of Td of the convolver 31 as manufactured, an adjustment is effected in the initial step. The test signal generator of FIG. 2 is connected to the arrangement of FIG. 1. Subsequently, the switch 41 is connected to its contact 1. In this fashion, the delay lock circuit 40 is as much as not activated even after completion of the initial synchronization, and the phase after the initial synchronization is maintained. The voltage of an information output of the delay lock circuit 40 is measured, using a suitable voltmeter.

The start signal is entered at a predetermined cycle, and the initial synchronizing operation is effected periodically. An operator adjusts the variable resistor 57 of FIG. 3 or the switch 65 of FIG. 4 while watching the voltmeter so that the voltmeter indicates the maximum value. In this fashion, the receiver can start its tracking operation, starting from the optimum phase, just after the initial synchronization. After the adjustment is completed, the switch 41 is connected to its contact 2.

The delay adjuster shown in FIG. 3 and FIG. 4 operates as described below.

The variety of the delay amount Td of the convolver 31 as manufactured can be corrected by adjusting the variable resistor 2. The head sensitive element 58 using a thermister, etc. supplies the function generator 59 with a voltage responsive to the ambient temperature. The function generator 59 produces a voltage which substantially cancels the variation amount of the delay element 51 responsive to the variation amount of Td due to the temperature characteristic of the convolver, and the voltage is added to an output voltage of the variable resistor 57 by the adder 60. The resulting voltage is applied to the diodes 53. When the temperature characteristic of the delay element 51 is out of problem, the adder 60, function generator 59 and heat sensitive element 58 may be omitted so that the variable resistor 57 directly applies its output to the diodes 53.

The arrangement of FIG. 3 has an advantage that the delay amount is continuous and variable. However, it is difficult to arrange a function generator 59 which can offsets the temperature characteristic of the convolver. In this connection, the arrangement of FIG. 4 is preferable in a receiver having a CPU or other controller.

In FIG. 4, the delay line has taps, and its delay amount is selected stepwisely by the multiplexer 62. The CPU 63 uses the output value of the switch 65 as its offset value, and reads the output of the temperature detector 64 to control the multiplexer 62, using a temperature-to-delay amount conversion table data stored in the memory 66. In this fashion, highly accurate temperature compensation is possible against any complicate function of the temperature characteristic of the convolver.

The delay adjuster may be formed by a shift register in lieu of the aforegoing two examples. Such an arrangement using a shift register is effective when a large variable range is desired, and if it is used in combination of the arrangement of FIG. 3 or FIG. 4, a large variable range and a sufficient control resolving-power are obtained.

Further, the invention can be used also in any spread spectrum receiver having an arrangement using a convolver to detect synchronization and control the code phase of a reference pseudo noise code other than a receiver using a delay lock or other phase lock loop for code phase tracking.

As described above, the invention can eliminate a code phase error in the initial synchronization caused by a variety of the delay amount of the convolver as manufactured. Further, it is also possible to eliminate a code phase error in the initial synchronization caused by the temperature characteristic of the delay time of the convolver.

What is claimed is:
1. A spread spectrum receiver, comprising:
   code generator means for generating a reference pseudo noise code and a further pseudo noise code;

first correlating means which includes a convolver for producing a first correlation output signal in response to said reference pseudo noise code and a received signal containing pseudo noise;

second correlating means for producing a second correlation output signal in response to said received signal and said further pseudo noise code and for synchronizing the phase of a clock used to produce said further pseudo noise code with the phase of a clock used to produce said pseudo noise contained in said received signal;

code phase adjuster means for generating an output signal which causes said code generator means to adjust the phase of said further pseudo noise code by an amount which is a function of a time interval from the start of said reference pseudo noise code to said first correlation output signal; and delay adjuster means for delaying said output signal of said code phase adjuster means by a time delay which is adjustable.

2. A spread spectrum receiver of claim 1, wherein said delay adjuster means includes a delay circuit having an inductance and a capacitor, said capacitor being a variable capacitance diode.

3. A spread spectrum receiver of claim 2, wherein said variable capacitance diode is supplied with a voltage which is an offset voltage value.

4. A spread spectrum receiver of claim 2, wherein said variable capacitance diode is supplied with a voltage which is a sum of an offset voltage value and a voltage value representative of a temperature.

5. A spread spectrum receiver of claim 1, wherein said delay adjuster includes a delay line having plural taps and includes means for extracting from a selected one of said taps said output signal of said code phase adjuster.

6. A spread spectrum receiver of claim 1, including switch means for selectively applying one of an external clock and an output of a clock generator having its phase controlled by said second correlation means to said code generator means for producing said reference pseudo noise code and said further pseudo noise code.

7. A spread spectrum receiver of claim 1, wherein said reference pseudo noise code is a time-inverted image of said further pseudo noise code.

8. A spread spectrum receiver of claim 1, wherein said delay adjuster means includes an input terminal, an output terminal, a coil extending between said input terminal and said output terminal and having a plurality of taps, a plurality of capacitance devices each having a first end coupled to a respective one of said taps and having a second end, and voltage means for applying to said second end of each said capacitance device a voltage.

9. A spread spectrum receiver of claim 8, wherein said voltage means includes sensor means for sensing an ambient temperature and means responsive to said sensor means for varying said voltage as a function of variations in said ambient temperature.

10. A spread spectrum receiver of claim 9, wherein said capacitance devices are each a variable capacitance diode having a cathode and an anode which are respectively said first and second ends thereof, said anodes all being connected together, and wherein said delay adjuster means includes a capacitor connected between said anodes and ground, and a resistor connected between said output terminal and ground.

11. A spread spectrum receiver of claim 1, wherein said delay adjuster means includes sensor means for sensing an ambient temperature, and means responsive to said sensor means for adjusting said time delay as a function of variations in said ambient temperature.

12. A spread spectrum receiver of claim 1, wherein said delay adjuster means includes an input terminal, an output terminal, a coil having one end connected to said input terminal and having a plurality of taps, a multiplexer having a plurality of inputs each connected to a respective said tap and having an output connected to said output terminal, and control means for causing said multiplexer to couple a respective one of its inputs to its output.

13. A spread spectrum receiver of claim 12, wherein said control means includes temperature sensor means for sensing an ambient temperature, and processing means responsive to said sensor means for causing said multiplexer to successively couple different said inputs thereof to said output thereof in response to a progressive change in said ambient temperature.

14. A spread spectrum receiver of claim 13, wherein said control means includes a switch, said processing means being responsive to actuation of said switch for changing the input of said multiplexer coupled to the output thereof at a given ambient temperature.

* * * * *